United States Patent [19]

Qiu et al.

[11] Patent Number: 5,981,446
[45] Date of Patent: Nov. 9, 1999

[54] APPARATUS, COMPOSITIONS, AND METHODS OF EMPLOYING PARTICULATES AS FRACTURING FLUID COMPOSITIONS IN SUBTERRANEAN FORMATIONS

[75] Inventors: Xiaoping Qiu, Tulsa; Erik B. Nelson, Broken Arrow, both of Okla.; Philip F. Sullivan, Bellaire, Tex.; Vernon Constien, Sperry, Okla.

[73] Assignee: Schlumberger Technology Corporation, Sugar Land, Tex.

[21] Appl. No.: 08/891,320

[22] Filed: Jul. 9, 1997

[51] Int. Cl.⁶ .............................. C09K 3/00; E21B 43/17
[52] U.S. Cl. ................... 507/209; 507/271; 507/273; 507/277; 507/922; 166/308
[58] Field of Search ................... 507/209, 271, 507/273, 277, 922; 166/308

[56] References Cited

U.S. PATENT DOCUMENTS

| | | |
|---|---|---|
| 3,974,077 | 8/1976 | Free . |
| 4,033,415 | 7/1977 | Holtmyer et al. . |
| 4,469,620 | 9/1984 | Kohn . |
| 4,505,826 | 3/1985 | Horton . |
| 4,828,034 | 5/1989 | Constien et al. . |
| 5,190,374 | 3/1993 | Harms et al. . |
| 5,259,455 | 11/1993 | Nimerick et al. . |
| 5,360,558 | 11/1994 | Pakulski et al. ............ 507/922 |
| 5,362,408 | 11/1994 | Pakulski et al. . |
| 5,372,732 | 12/1994 | Harris et al. ............... 507/922 |
| 5,382,411 | 1/1995 | Allen . |
| 5,445,223 | 8/1995 | Nelson et al. . |

FOREIGN PATENT DOCUMENTS 0 508 817 A1  10/1992  European Pat. Off. .

OTHER PUBLICATIONS

J.L. Stromberg, D. Brown, and R.J. Curtice, Halliburton Services, "Modeling the Effects of Time, Temperature, and Shear on the Hydration of Natural Guar Gels," *SPE Society of Petroleum Engineers* SPE 21857 (Apr. 1991), pp. 533–543.

T.E. Allen, Halliburton Energy Services, "Pregel Blender Prototype Designed to Reduce Cost and Environmental Problems," *SPE Society of Petroleum Engineers* SPE 27708 (Mar. 1994), pp. 715–720.

*Primary Examiner*—Philip Tucker
*Attorney, Agent, or Firm*—Douglas Y'Barbo

[57] ABSTRACT

Methods and apparatus are disclosed for fracturing subterranean formations using fracturing fluids that are hydrated from dry mix blends. One aspect of the invention comprises a dry blended particulate composition for hydraulic fracturing comprising a particulate hydratable polysaccharide, a particulate crosslinking agent, and a slowly releasing particulate base. The compositions employ controlled release methods of particle dissolution. The invention reveals a dry blended particulate composition capable of significantly improved high temperature stability. Further, methods of fracturing and apparatus for rapidly hydrating and pumping the fracturing fluid into subterranean formations are disclosed.

57 Claims, 10 Drawing Sheets

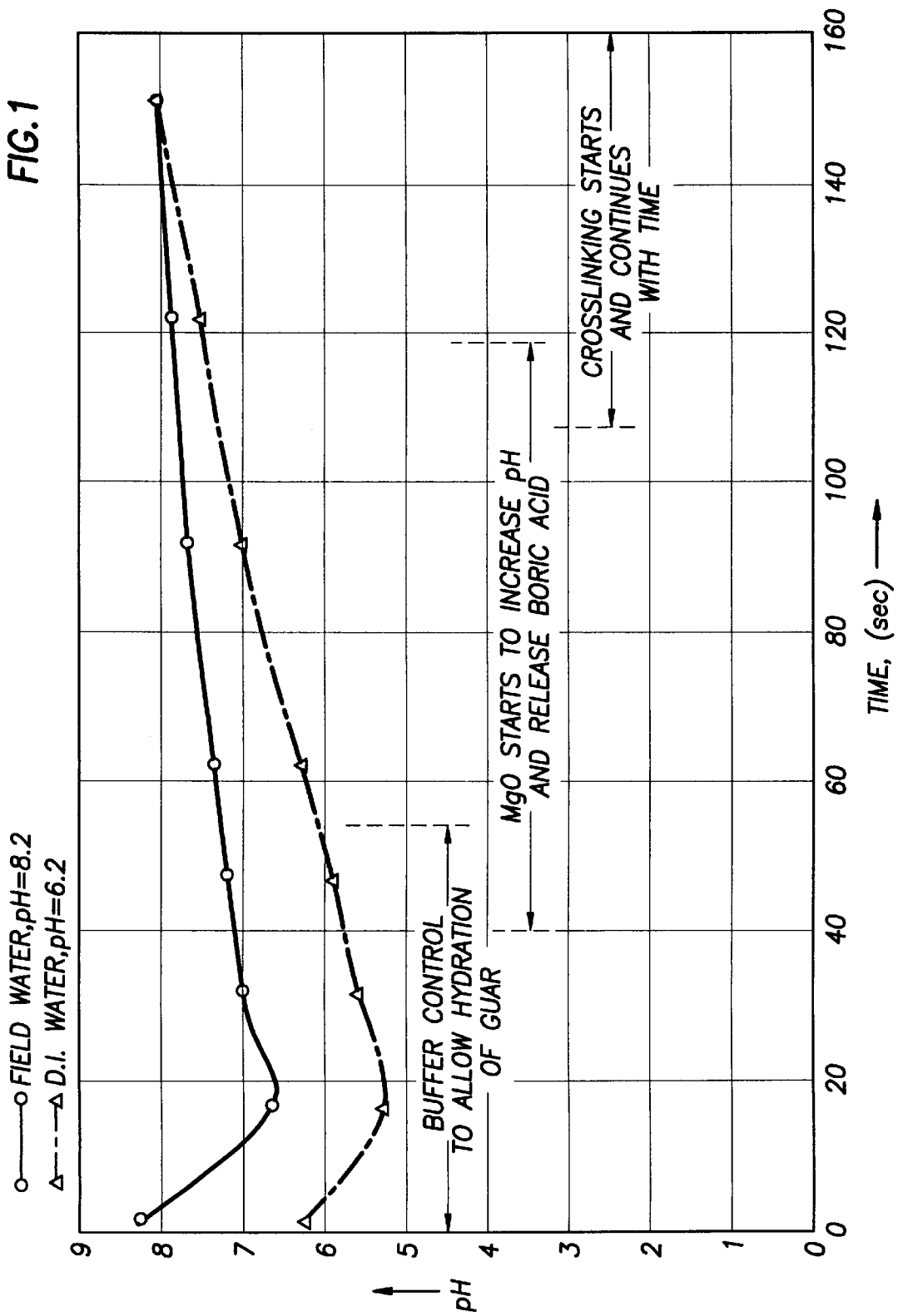

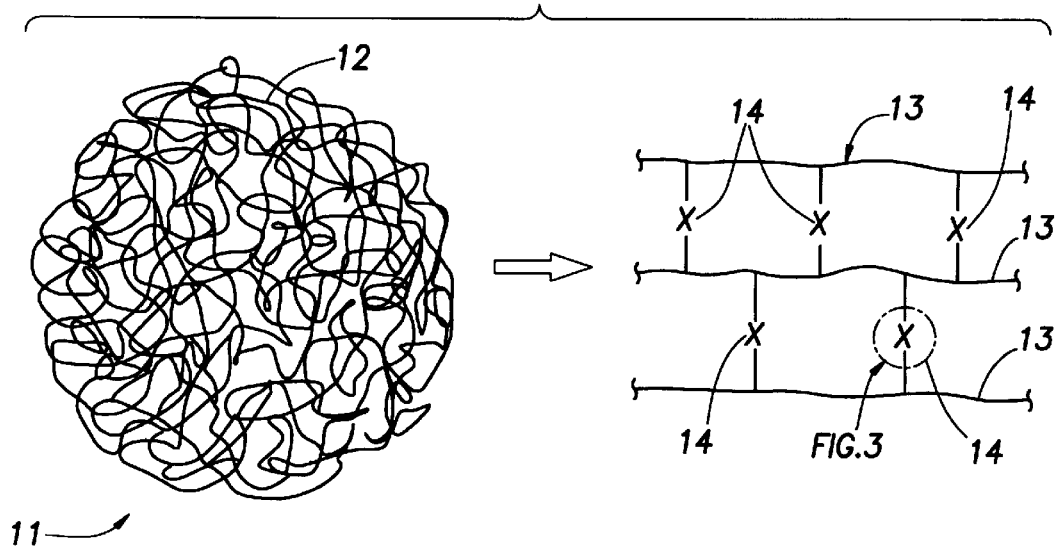
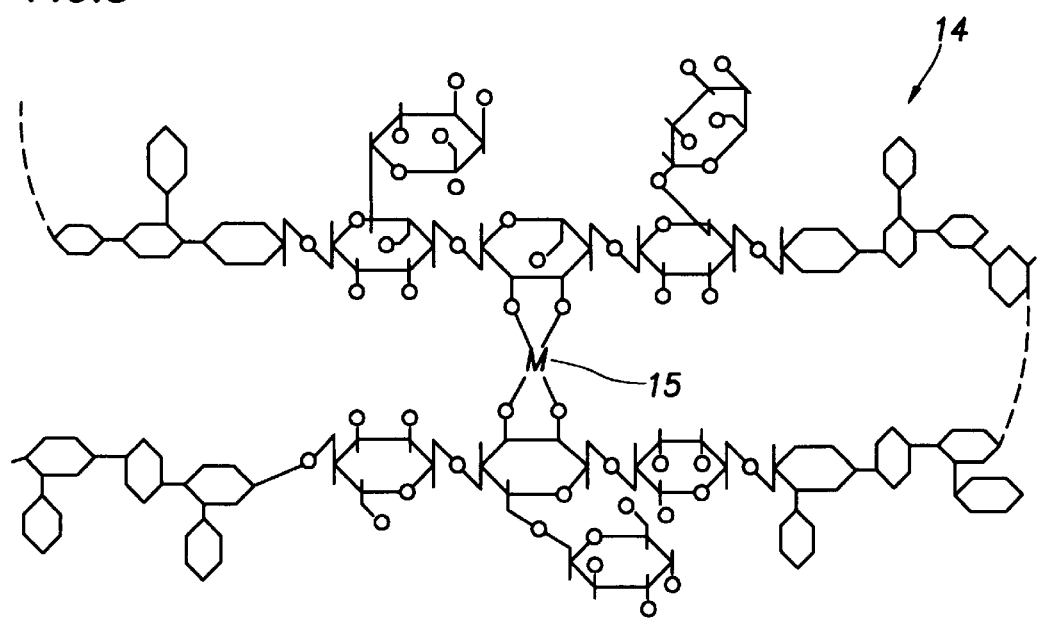

APPARATUS, COMPOSITIONS, AND METHODS OF EMPLOYING PARTICULATES AS FRACTURING FLUID COMPOSITIONS IN SUBTERRANEAN FORMATIONS

BACKGROUND OF THE INVENTION

1. Field of the Invention

This invention relates primarily to methods and apparatus of fracturing subterranean formations using fracturing fluids that are hydrated from dry mix blends. In particular, one aspect of this invention comprises a dry blended particulate composition for hydraulic fracturing comprising a particulate hydratable polysaccharide, a particulate crosslinking agent, and a slowly releasing particulate base, using controlled release methods of particle dissolution. The invention reveals a dry blended particulate composition capable of significantly improved rheological properties at both low and high temperatures.

2. Description of the Prior Art

In the recovery of hydrocarbons from subterranean formations it is common practice, particularly in formations of low permeability, to fracture the hydrocarbon-bearing formation, providing flow channels. These flow channels allow the oil or gas to reach the wellbore so that the oil or gas may be pumped from the well.

In such fracturing operations, a fracturing fluid is hydraulically injected down a wellbore penetrating the subterranean formation and is forced against the formation strata by pressure. The formation strata or rock is forced to crack and fracture, and a proppant is placed in the fracture by movement of a viscous fluid containing proppant into the crack in the rock. The resulting fracture, with proppant in place, provides improved flow of the recoverable fluid, i.e., oil, gas, or water, into the wellbore.

Water-based hydraulic fracturing fluids typically comprise a thickened or gelled aqueous solution formed by metering and combining large volumes of fluids upon the surface of the ground, mixing them together in large mixing apparatus, and blending them with proppant before pumping the fracturing fluid mixture downhole. Proppant particles carried by the fracturing fluid remain in the fracture created, thus propping open the fracture when the fracturing pressure is released and the well is put in production. Suitable proppant materials include sand, sintered bauxite, or similar materials. The "propped" fracture provides a larger flow channel to the well bore through which an increased quantity of hydrocarbons can flow, thereby increasing the production rate of a well.

Obstacles facing the fracturing industry include large costs and environmental effects of operating and conducting fracturing treatments. Large costs are associated with storing and maintaining numerous liquids in large quantities in various, and sometimes remote, regions of the world. Further, the environmental effects of spillage and relatively large leftover quantities of fluid on site are increasingly becoming a problem for fracturing operators, as disposal of fluids is particularly troublesome under newer and more stringent environmental regulations.

Water-based hydraulic fracturing fluids usually contain a hydratable polymer that acts to thicken the fracturing fluid and may be further thickened by chemically crosslinking. Such a polymer typically is presented in a powder form, or in a slurried form in a hydrocarbon such as diesel, and is hydrated upon the surface of the ground in a batch mix liquid operation in large mixing tanks for a significant period of time, and then mixed with other liquid additives of various types using large expensive equipment. After hydration, the polymer is crosslinked to further thicken the fluid and improve its viscosity at elevated temperatures often encountered in the fracture, so it can carry proppant into the fracture once it is pumped into a wellbore below the ground surface. Natural polymers include polysaccharides, such as guar and derivatives of guar such as hydroxypropyl guar (HPG), carboxymethylhydroxypropyl guar (CMHPG), carboxymethyl guar (CMG), or hydrophobically modified guar. Borate, zirconium and titanium containing crosslinking agents typically are used. Both borate and organometallic crosslinking agents offer advantages depending upon the fluid performance and cost requirements of the particular fracturing treatment.

Numerous chemical additives such as antifoaming agents, acids or bases, or other chemicals may be added to provide appropriate properties to the fluid after it is hydrated.

It has long been recognized that large cost savings and convenience could be achieved by using a dry blend composition (i.e. similar in concept to a "cake mix") which is conveniently prepackaged for worldwide shipment, and which contains essentially all of the chemicals needed to prepare fracturing fluid in one dry granular packaged unit. Unfortunately, however, the granular compositions of the prior art have not provided the required storage stability and fluid properties needed in the industry, and have not offered the advantages that may be realized by this invention.

For example, U.S. Pat. No. 4,505,826 to Horton discloses a mixture of dry ingredients which, under some conditions, is stated to be capable of crosslinking at temperatures in the range of 80° F. to about 130° F. Zirconium acetyl acetonate is used as the crosslinking agent. The process, as set forth in the patent, apparently requires that the crosslinking agent become active before the gelling composition is completely hydrated. It is stated that if crosslinking of that particular fluid system is begun before the gelling composition is completely hydrated, further hydration is essentially halted and peak viscosity will never be reached, resulting in an inferior fluid.

Until the advent of this invention, it has been widely believed that hydration and crosslinking of a fracturing fluid composition could not occur simultaneously, because it was believed that no fracturing fluid system could achieve sufficient viscosity if it was "prematurely" crosslinked before the guar was fully and completely hydrated.

Other examples are known in which attempts were made to provide at least some of the fracturing fluid components in granular form. In 1974 and 1975, a fracturing fluid system was designed by Dustin Free, who was employed by a division of the Dow Chemical Company which was a predeccesor of the Dowell division of Schlumberger Technology Corporation, and his fluid is believed to have been used commercially after that time. That fluid system comprised liquid components and solid granular components. The mixture is believed to have been about: (1) 80 wt % guar, (2) a buffer having 3.3 wt % citric acid, 3) 6.66 wt % sodium acetate, (3) 8.0 wt % magnesium oxide, (4) 2 wt % silica flour, and was crosslinked with (5) liquid boric acid, wherein the liquid boric acid was added in "liquid add" form at the blender just prior to pumping the mixture downhole.

Other publications and patents have recognized the potential advantages of using a dry mix composition, but until the advent of this invention, the industry has not achieved a dry mix blend composition in which essentially all of the required chemical components (except of course the aqueous component) were placed in one dry mixture, the fluid being suitable for continuous mixing and simultaneous hydration and crosslinking of polysaccharide, with adequate storage stability. Further, until this invention, there was not a dry blend fluid system that was capable of providing the properties needed for optimum fracturing under downhole conditions.

SUMMARY OF THE INVENTION

The invention includes compositions, apparatus, and methods. In one embodiment, a method of fracturing is provided which comprises providing a dry blend a liquid and a blending device, mixing the dry blend with the liquid to form a first composition, and then blending the first composition in the blending device. After blending, the first composition is discharged through a tubular and develops an effective viscosity in the tubular and in the subterranean formation. In employing this method, it is important to limit the time required to mix and blend to no greater than about 3 minutes, and more preferably, no greater than about 1 minute.

In one embodiment of the invention, the viscosity of the first composition is at least 20 cp @ 170 sec$^{-1}$ at the time it is discharged from the blender, and prior to being pumped downhole. The viscosity increase in the tubular is important, and in one embodiment the viscosity of the first composition at a time 8 minutes after beginning to pump it through the tubular downhole is at least 50 cp @ 170 sec$^{-1}$, in cases for which the tubular has an inner diameter not less than 1.6 inches. The minumum viscosity is determined by laboratory simulation.

In other embodiments, proppant is mixed with the first composition to form a slurry before pumping the slurry downhole.

Typically, the composition includes a dry blended particulate composition for hydraulic fracturing, comprising a particulate hydratable polysaccharide, the polysaccharide formed of discrete particles. Also present is a particulate crosslinking agent, the crosslinking agent being effective to crosslink the hydratable polysaccharide composition.

In another embodiment of the invention, a dry blended particulate composition is shown for hydraulic fracturing of subterranean formations, the composition including a particulate hydratable polysaccharide. The polysaccharide is formed of discrete particles and capable of continuous mixing to form a viscous fracturing fluid composition, the hydratable polysaccharide being selected from the group of polysaccharides consisting of guar, hydroxypropyl guar, carboxymethylhydroxypropyl guar, carboxymethyl guar, synthetic polymers, and guar-containing compounds. A dry buffer system optionally may be included to rapidly adjust the pH to allow hydration to begin. Also included is a particulate crosslinking agent, said agent being effective to crosslink the hydratable polysaccharide composition substantially without prolonged mixing operations above ground, the crosslinking agent being selected from the group of agents comprising borates, zirconates, titanates antimony, and aluminum. Also included is particulate metal oxides which adjust pH and allow crosslinking to begin. The metal oxide may be selected from magnesium oxides, calcium oxides, strontium oxides and oxides of group IIa metals.

Other high temperature stabilizers optionally may be employed, including sodium thiosulfate. Stable, dry viscosity breakers could also be present, such as enzymes, encapsulated oxidizers, or oxidizers which are activated only at high temperatures. Suspension agents and surfactants may also be present.

In one aspect, the composition can be a dry blended particulate composition for hydraulic fracturing of subterranean formations using a particulate hydratable polysaccharide, a particulate borate crosslinking agent, and a slowly releasing particulate base, wherein the release of the particulate borate crosslinking agent and the particulate base are controlled.

A method of treating a subterranean formation using a fracturing fluid which is rapidly hydrated at the well site is shown, using as a starting ingredient a dry blended particulate, comprising providing a liquid component, a dry particulate component, and then mixing the liquid component and dry particulate component to form a fracturing fluid.

An apparatus for metering and dispersing a dry blended particulate composition is also shown in this invention, the apparatus comprising a mixing means capable of generating a first stream of aqueous fluid, the mixing means being adapted to combine the first stream of aqueous fluid with a dry blended particulate composition to form a dispersed slurry concentrate, the mixing means comprising a metering feeder and an annular eductor. The apparatus employs a particulated slowly soluble base, a polysaccharide, and a optionally may include a buffering system for initial pH adjustment of mix water pH. Further, it may optionally include high temperature stabilizers or viscosity breakers. Additionally, a turbulence enhancement device for vigorously mixing the dispersed slurry concentrate with a second stream of aqueous fluid to form a homogenous fracturing fluid is disclosed, the turbulence enhancement device being adapted for initiating hydration of said polysaccharide.

DESCRIPTION OF THE PREFERRED EMBODIMENTS

There has been a long-felt need in the art of hydraulic fracturing for an apparatus, composition, and method to continuously mix fracturing fluids from a dry blended composition, enabling rapid and precise pumping of an effective fracturing fluid downhole. This invention addresses that need.

One of the major difficulties in designing chemistry and equipment for continuous mix fracturing is the short time frame in which events must occur. For example, in typical South Texas fracturing treatments, it is not unusual for treatment rates to be as high as 70 BPM (barrels per minute) (~3000 gal./min.). This quantity of fluid flow is very large, and at this high rate, a typical guar metering rate would be 120 lb/min and a typical proppant rate could be over 11,000 lb/min.

Hydration time very significant in designing equipment and providing the appropriate amount of mixing energy. The equipment must be portable, and must conform to weight and dimensional regulations for road transport. Fast hydration is greatly preferred. Hydration must occur rapidly, and the fluid and equipment must be designed to afford a very quick hydration time, with large rates of flow. To achieve this objective, the fluid is advantageously hydrated in the tubular itself on its way down to the fracturing zone, and crosslinking can overlap in time with hydration.

Preferably, mixing and blending above ground occurs in less than three minutes, most preferably in less 1.5 minutes. This facilitates the use of holding tanks and mixing and blending equipment having less bulk and weight, and therefore less cost. Further, development of viscosity of the first composition prior to pumping into the tubular (measured after discharge from the blender) is preferably at least 20 cp @ 170 sec$^{-1}$. Additionally, the minimum viscosity preferred to be attained by the fluid as it enters the fracture in the subterranean formation, as measured by laboratory simulation, is at least 50 cp @ 170 sec$^{-1}$. Viscosity is needed downhole to adequately fracture the formation face, and to carry proppant downhole into the fracture.

BRIEF DESCRIPTION OF THE DRAWINGS

FIG. 1 shows a chronology representing one embodiment of this invention showing pH values plotted against time for the first few minutes of the hydration of the dry blends;

FIG. 2 shows polysaccharide molecular strands of guar as they uncurl and become capable of crosslinking;

FIG. 3 is a close-up of the crosslinking bond formed between two strands of guar;

FIG. 1 shows the sequence of events in one embodiment of this invention showing a very rapid hydration, crosslinking and downhole pumping of the fracturing fluid. In FIG. 1, the pH of high temperature dry blend systems in de-ionized water and field water are shown. Field water was at pH of 8.2, while the de-ionized water was at a pH of 6.2.

Figure 4:
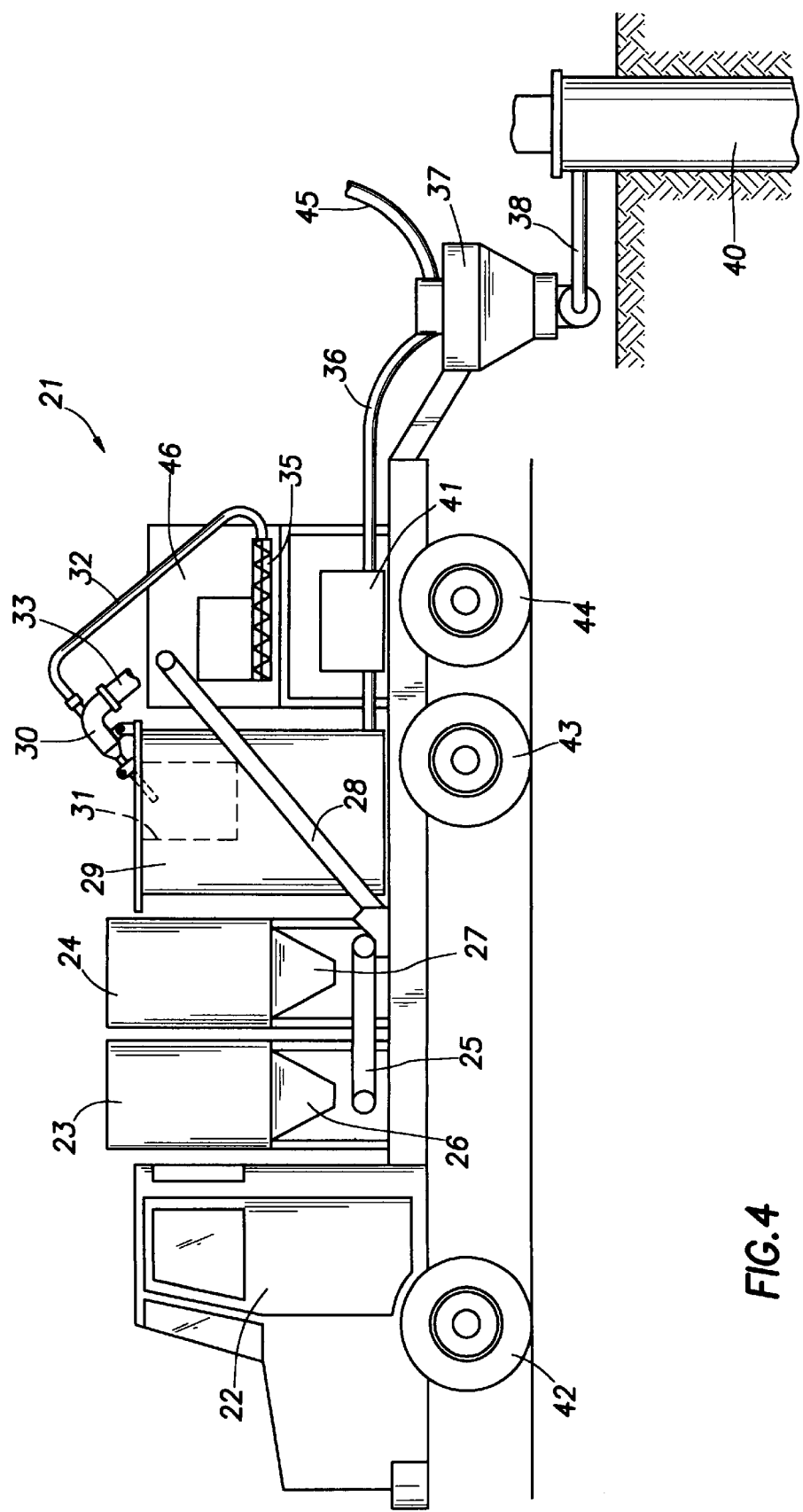
FIG. 4 reveals the equipment set-up of the present invention for rapidly hydrating the dry blended composition.

During the first 20 seconds, an optional buffer stabilizes and lowers the pH of the dry mix/water combination. Once pH is lowered, then a slowly releasing base begins to raise the pH as required to achieve crosslinking, this step occurring between about 40 seconds and 120 seconds.

Lastly, the fluid begins the crosslinking process well before hydration is complete, at about 110 seconds (in this particular example), and the fracturing fluid is rapidly blended with proppant and pumped downhole.

The basic sequence of events is that pH is initially lowered to facilitate uncurling and lengthening of the polysaccharide chains, followed by hydration and then soon thereafter crosslinking of the polysaccharide chains. This is made possible, in part, by the slight delay in availability of base to raise the pH (as seen in the 20 second mark of FIG. 1), followed by a slightly longer delay in availability of the crosslinking species. Timing is critical in the deployment of this invention.

Controlling the degree of crosslinking of polysaccharides during the hydration step is accomplished by controlling the rate of dissolution of the base. In one embodiment, the rate of dissolution of the base is accomplished by using particles of slowly dissolving base. The particles are generally capable of releasing measured amounts of base over time. In another embodiment, the method of controlling the rate of dissolution is accomplished by use of an encapsulated base.

HYDRATION OF THE POLYSACCHARIDE

Guar flour, a common polysaccharide used in fracturing, is obtained by grinding and purifying guar beans and splits. During this process, the hull, germ, and sheath layers of cells are removed leaving about 25–35% endosperm. A wet grinding process can be used advantageously to cause cleavage along the cell walls and minimize degradation of the galactomannan molecular weight. The typical molecular weight of guar used in hydraulic fracturing operations is about 2–2.4 million.

Hydration of guar particles containing long chain polysaccharides has been observed by microscopy. In FIG. 2, the polysaccharide 11 is made up of individual long chains 12. The cells imbibe water, swell and then burst at points along the cell wall releasing galactomannan. FIG. 2 depicts the uncurling and crosslinking of polysaccharide chains which occur upon hydration and crosslinking of guar. On the left side of the FIG. 2 is shown dry polysaccharide chains of guar in the curled state, and then following hydration of the polysaccharide chains (see right side of FIG. 2) the molecular chains 13 straighten, facilitating crosslinking between chains at bonding sites 14.

FIG. 3 shows intermolecular crosslinking of hydroxypropyl guar at bonding site 14. A metal atom 15 is shown forming the bond between adjacent chains.

In general, continuous-mix fracturing applications require polymers that hydrate rapidly. The guar particles must first be dispersed so that individual particles can absorb water. Once the polymer is dispersed, its ability to absorb water will determine the hydration rate.

One useful equipment set-up is shown in FIG. 4. There is shown blending truck 21 comprises of a cab 22 and various other equipment as described, including wheels 42, 43 and 44. Dry tanks 23 and 24 retain the dry blend composition material and store it on the truck for transport to the job site. Conveyor 25 receives dry blended material after it is released from hoppers 26 and 27. Inclined conveyor 28 takes the dry blended material upwards and releases it into receptacle 46, where it is advanced horizontally by screw feeder 35 and ultimately into powder vacuum input line 32.

Gel gun 30 operates to mix at high speed water from water flow line 33 with dry blend material from flow line 32, mixing it in turbulent fashion as it is ejected from the gun into mixing zone 31. The mixed material is then transported into tank 41 and ultimately by way of output line 36 into blending unit 37 where it is mixed with proppant brought from line 45. Blended fracturing fluid is pumped into blender output line 38 and ultimately into wellbore 40 for transmission into the formation.

Figure 5:
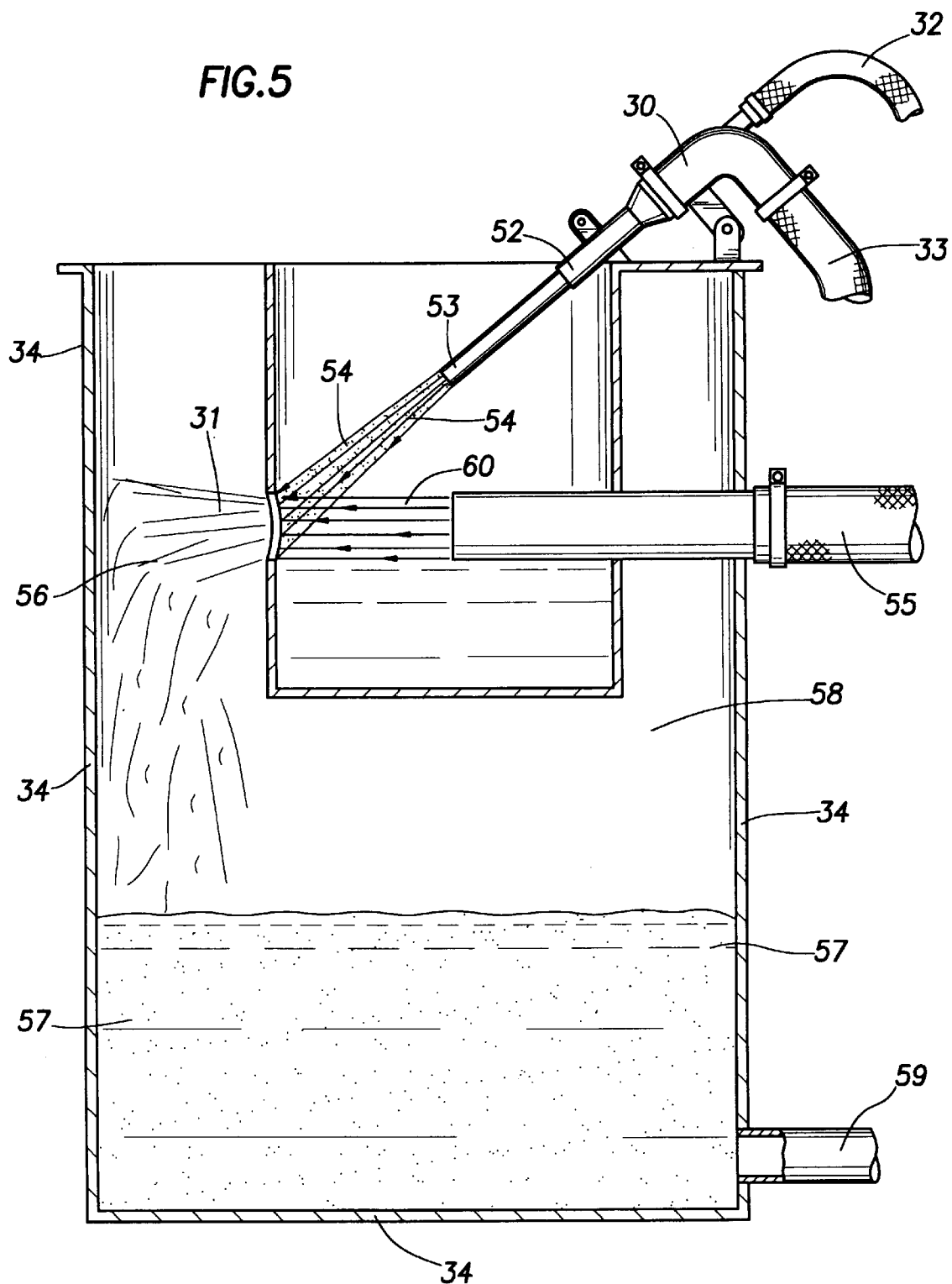
FIG. 5 shows a closer view of the operation of the method and equipment used to mix the dry blended powder with water.

In FIG. 5, one can see gel gun 30, which serves as a joining point for powder vacuum input line 32 and water flow line 33. The gel gun conveys, wets and disperses powder into liquids into the mixing unit 34. The powder is conveyed into the mixing zone 31 by the vacuum generated when pressurized fluid is forced through its annular nozzle. The fluid is discharged as a high velocity hollow jet stream as it passes through barrel 52 to the distal end of the barrel 53 into a high velocity fluid jet 54. There, the jet mixes with water stream 60 which is ejected from water line 55. The zone of turbulence 56 is the area in which water stream 60 mixes with high velocity fluid jet 54. Reservoir 57 is bounded on its top surface by air space 58. Fluid exits through output line 59.

A gel gun is only one embodiment that may be employed to achieve rapid and complete mixing of powder and water at an acceptably high rate, but it is the preferred embodiment. The preferred gel gun may be obtained from Semi-Bulk Systems of 159 Cassens Court, Fenton, Mo. 63026-4500, and it is known as the Ejector-Mixer System.

SIMULTANEOUS HYDRATION AND CROSSLINKING REDUCES COSTS

Adding a fully formulated dry mix composition to an aqueous component on the surface of the ground and allowing the hydration of polysaccharide to take place in the below-ground tubing and subterranean fracture significantly reduces equipment costs.

Testing of the principle involves measuring the viscosity increase in a formulation with a bench top mixing device where the mixing energy input per unit volume is correlated to the energy input resulting from pumping in casing and tubing. The approach is to simulate the energy dissipated during pumping.

The energy Input Rate/Vol ($\Phi_v$) in tubing is given by:

$$(\Phi v)_t = 4.492 \frac{\Delta PQ}{LD^2}; \text{hp/ft}^3$$

Where $\Delta P$ is the friction pressure of the fluid in psi, L is the pipe length in ft Q is the flow rate in bpm, and D is the pipe diameter in inches. It is possible to convert this energy input into a laboratory bench top mixing device.

Where $\Omega$=RPM,

T is torque in in.-$oz_f$, and V is volume in $cm^3$

An example of an experiment in this regard is as follows:
Determine $(\Phi_v)_m$ for a deep well simulation:
The parameters are:
Pipe I.D.: 2.441 inch
Perf. Depth: 10000 ft
Fluid: WF140 (40 ppt linear Guar)
Pump Rate: 15 bpm For a 40# gel pumped in a 2.441 inch tubing at 15 bpm the $$\frac{\Delta P}{L} = 0.225 \text{ psi/ft}$$

Therefore $$(\Phi v)_t = 4.492 \frac{\Delta PQ}{LD^2}; 2.54 \text{ hp/ft}^3$$

Setting $(\Phi_v)_m = (\Phi_v)_t = 2.54$ hp/ft$^3$, the following conditions for the laboratory bench top mixer conditions are obtained:
RPM: 2100 RPM
Torque: 15.1 inch-$oz_f$
Fluid Volume: 350 ml
Mixing Time: ≈4 min.

Development of a hydration model may be utilized to optimize the results obtainable from this invention.
Hydration (%)=F(Gel Concentration, Water Temp, Tubing Size, Pump Rate, Well Depth)

FIG. 4 shows the scheme of a truck utilized for deployment of this invention.

THE COMPOSITIONS OF THIS INVENTION

Two of the dry blended borate crosslinked fluid systems are revealed by this invention are: (1) a high temperature system (200–350° F.), and (2) a low temperature system (70–200° F.) These two systems contain dry additives to produce crosslinked borate fluids when added to water. The hydration of polymer begins essentially as soon as the blends contact water. The systems are designed so that most of the hydration and crosslinking will take place in the tubing, utilizing the mixing energy developed from pumping. The ratio of galactomannan gum to borate-containing crosslinking species by weight is between about 4:1 and 12:1, and the ratio of borate-containing crosslinking species to metal oxide is between about 1:1 and 1:4.

EXAMPLE 1

HIGH TEMPERATURE SYSTEM

A preferred composition for the high temperature system is shown below in Table 1.

TABLE 1

| Chemical Name | wt % |
| --- | --- |
| KCl | 35.22% |
| Solid antifoam (polypropylene glycol) | 5.56% |
| Guar | 27.04% |
| Magnesium oxide | 6.76% |
| Sodium thiosulfate | 4.06% |
| NaF | 12.67% |
| Boric acid w/11% SCX1530 coating | 4.86% |
| Sodium acetate (anhydrous) | 2.04% |
| Citric acid | 1.79% |

Figure 6:
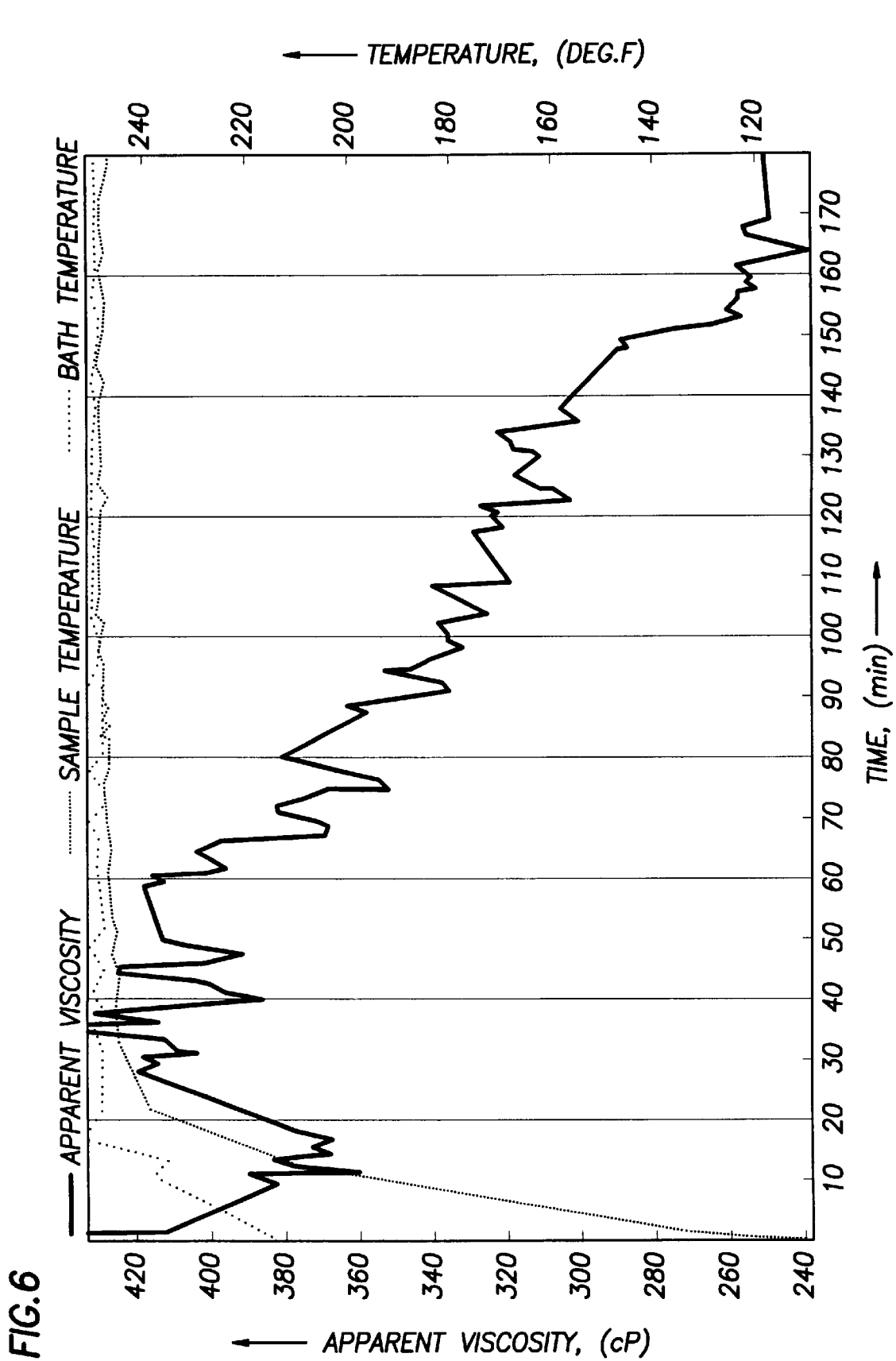
FIG. 6–10 show the variation of apparent viscosity with time for various concentrations of the dry blend of the present invention in water, at various temperatures.

Addition of 14.20 g of this mixture into 1000 ml water makes a fluid equivalent to 32 lb/Mgal of guar. In the lab, this mixture is added to a waring blender with 1000 ml water and speed set at 2100 rpm. After mixing 1 min., the fluid is pumped to a controlled shear mixer where the fluid is sheared at 1300 rpm for 5 min which simulates the mix condition of fluid pumping through a 2⅞ inch tubing at 15 bpm for 5 min. Afterwards, the fluid is then pumped directly into a Fann 50 cup and long term rheology is then measured. The rheology of this fluid is shown in FIG. 6. The fluid was sheared at 1300 RPM for 5 minutes before the long term rheology was performed at 250° F.

Figure 7:
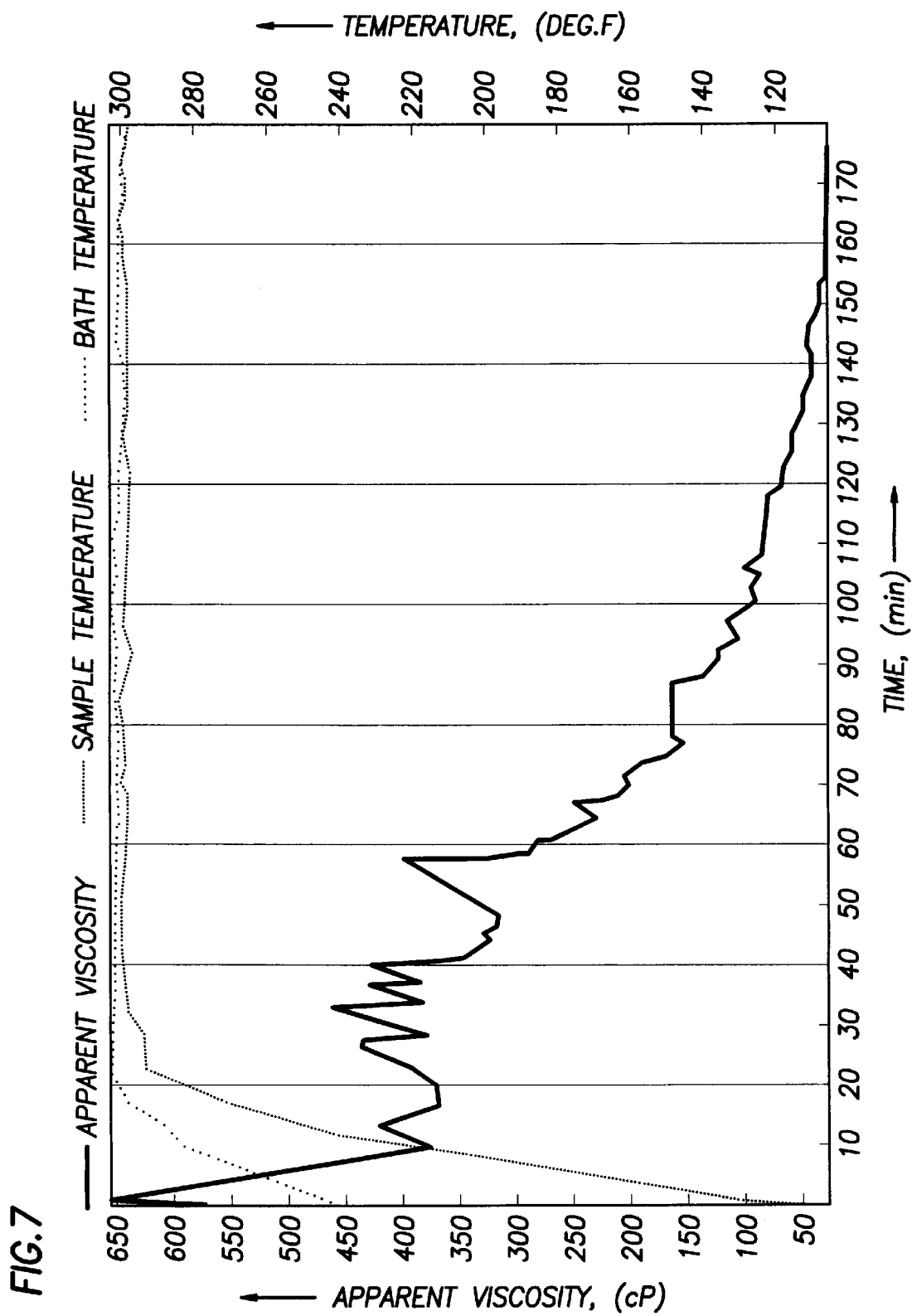

When 17.74 g of this mixture is added to 1000 ml water, the fluid is equivalent to 40 lb/Mgal of guar. The rheology is shown in FIG. 7. FIG. 7 shows the rheology data generated at 300° F. after the fluid was sheared at 1300 RPM for 5 minutes.

Figure 8:
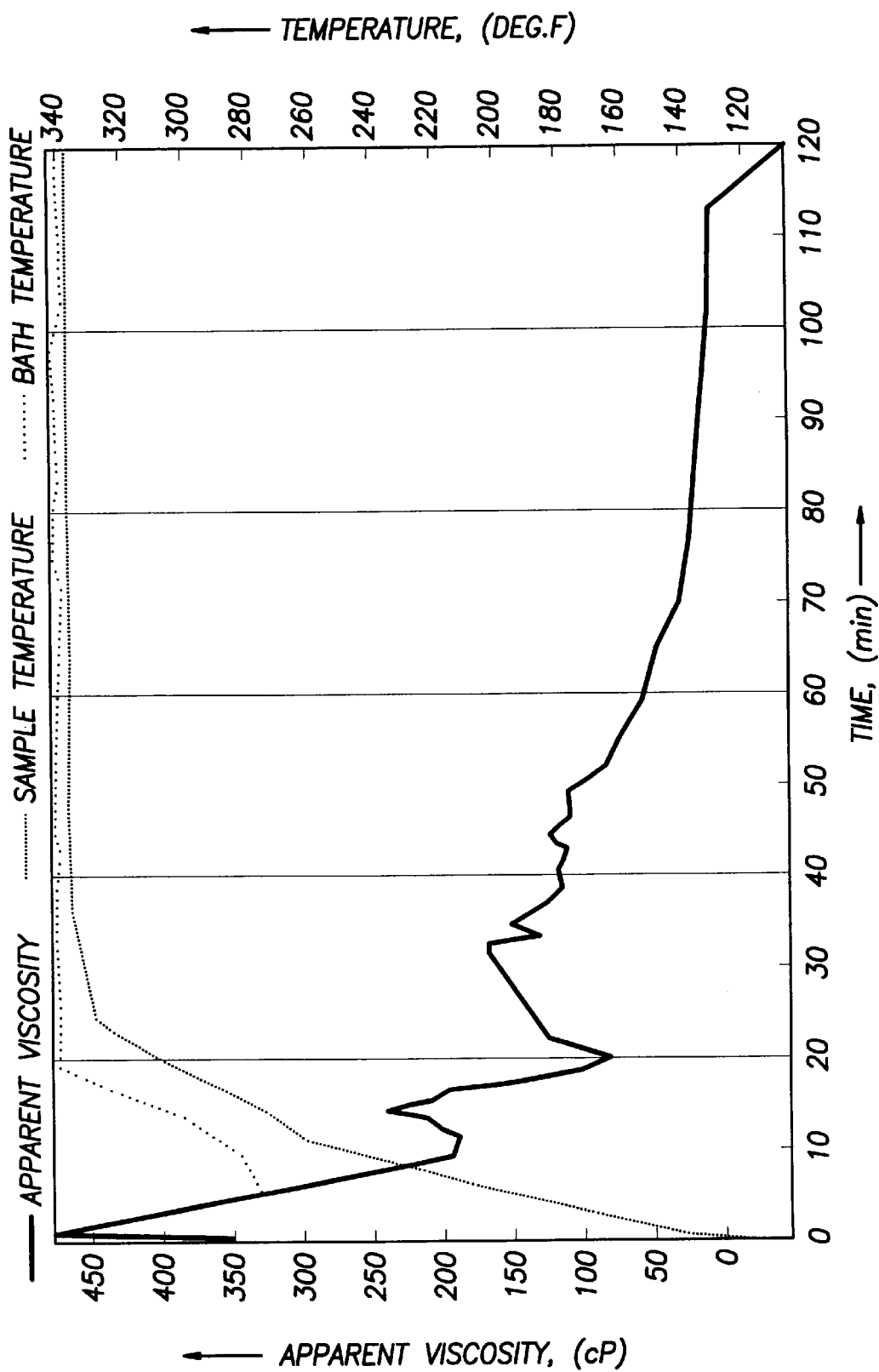

While 22.18 g of this mixture is added to 1000 ml of water, this makes a fluid equivalent to 50 lb/Mgal of guar. The rheology shown in FIG. 8 includes the rheology at 340° F. after the fluid being sheared at 1300 rpm for 5 minutes.

EXAMPLE 2

LOW TEMPERATURE SYSTEM

To prepare a low temperature composition, the percentages of components in Table 2 are provided.

TABLE 2

| Chemical Name | wt % |
| --- | --- |
| KCL | 45.12% |
| Solid antifoam | 7.11% |
| Guar | 32.42% |
| Magnesium oxide | 7.29% |
| Boric acid w/11% SCX1530 coating | 4.86% |
| Sodium acetate (anhydrous) | 2.09% |
| Citric acid | 1.10% |

Figure 9:
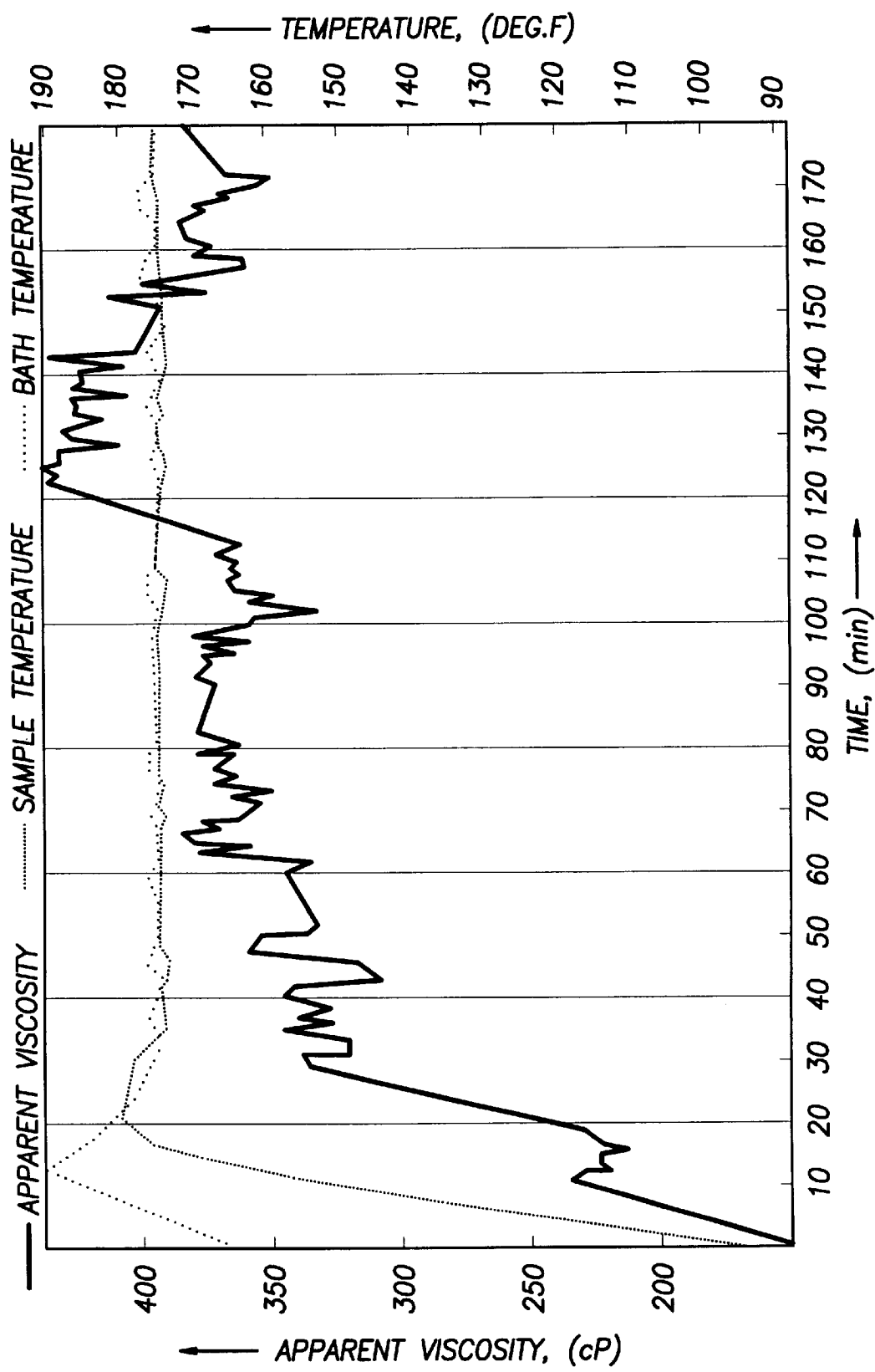

The low temperature system is most efficiently used at temperatures of 70–200$^d$F. When weighing 9.25 g of this mixture in the laboratory, and adding to 1000 ml water, it makes a fluid equivalent to 25 lb/Mgal of guar. In the lab, this mixture is added to a Waring blender with 1000 ml water and speed set at 2100 rpm. After mixing 1 min., the fluid is pumped to a controlled shear mixer where the fluid is sheared at 930 rpm for 2.5 min which simulates the mix condition of fluid pumping through a 4½ inch casing at 30 bpm for 2.5 min. Afterwards, the fluid is then pumped directly into a Fann 50 cup and rheology is then measured. The rheology of this fluid at 175° F. is shown in FIG. 9. The data of FIG. 9 was generated after the fluid was sheared at 900 RPM for 2.5 minutes.

TABLE 3

| Chemical Name | Concentration in field unit |
| --- | --- |
| M290 | 0.25 gal/Mgal |
| KCl | 41.69 lb/Mgal |
| ANTIFORM AGENT | 6.58 lb/Mgal |
| GUAR | 35 lb/Mgal |
| MGO 2 | 5.5 lbs/Mgal |
| MGO 1 | 0.5 lbs/Mgal |
| SODIUM THIOSULFATE | 10 lbs/Mgal |
| KF | 18 lbs/Mgal |
| BORIC ACID | 5 lbs/Mgal |

Figure 10:
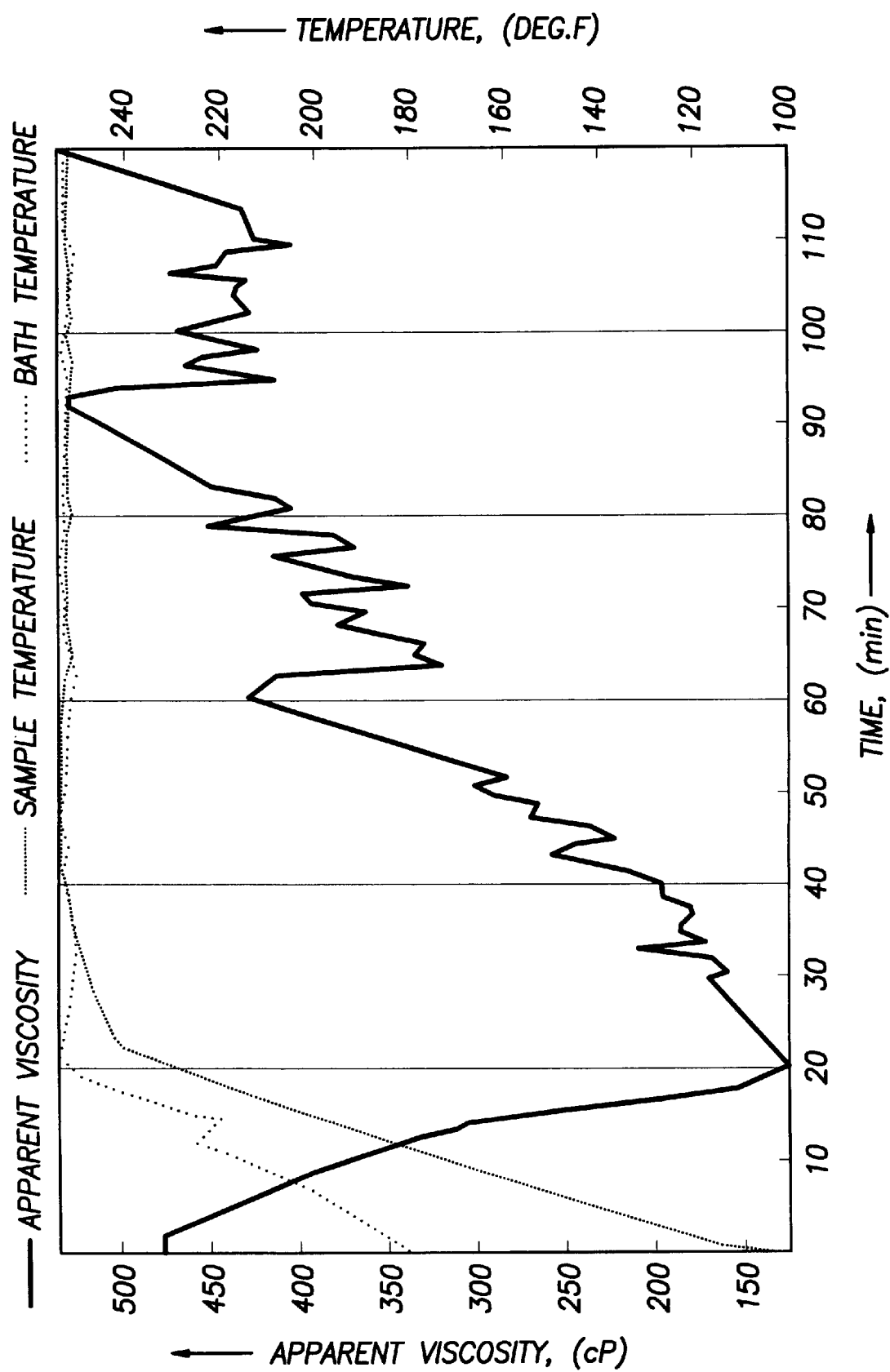

Shown in Table 3 are data which correlate to FIG. 10 and which shows the concentration of the given chemicals used to produce the data of FIG. 10, and the corresponding concentration in field units. FIG. 10 shows data that was generated at 250° F. after the fluid being sheared at 1300 RPM for 5 minutes at 250° F.

EXAMPLE 3

CHEMICAL SYSTEM WITHOUT BUFFER AT LOW TEMPERATURE

It is also feasible to provide proper pH conditions for good hydration and crosslinking of dry blends without such buffer systems. Any method which can provide the appropriate pH curve would be suitable. For example, MgO of a different reaction time could be used to control the pH environment. The most preferred systems without the using of buffers include a low temperature system like that shown below in Table 4:

TABLE 4

| Chemical Name | wt % |
| --- | --- |
| KCL | 45.12% |
| Solid antifoam | 7.11% |
| Guar | 32.42% |
| Magnesium oxide 1 | 7.29% |
| Magnesium Oxide 2 | 4.86% |
| Boric acid w/11% SCX1530 coating | 2.09% |

Table 5 below shows Fann 50 Viscosity at 100 1/s:

TABLE 5

| Time (min) | 175° F. Example M1 | 150° F. Example M2 | 100° F. Example M3 |
| --- | --- | --- | --- |
| 3 | 239 | 173 | 114 |
| 20 | 262 | 498 | 547 |
| 50 | 375 | 475 | 559 |
| 80 | 363 | 502 | 662 |
| 110 | 341 | 481 | |
| 140 | | | |

The most preferred systems are the composition systems with bufffer because the effect of mix water pH on fluid performance is minimized by the buffer. The coating level also affects the release time of borate and the crosslinking time for the fluids.

EXAMPLE 4

CHEMICAL SYSTEM WITHOUT BUFFER AT HIGH TEMPERATURE

A high temperature system without buffer reveals the following as shown in Table 6a:

TABLE 6a

| Chemical Name | wt % |
| --- | --- |
| KCL | 35.22% |
| Solid antifoam | 5.56% |
| Guar | 27.04% |
| Magnesium oxide 1 | 6.76% |
| Magnesium Oxide 2 | 4.06% |
| Sodium thiosulfate | 12.67% |
| NaF | 4.86% |
| Boric acid w/11% SCX1530 coating | 2.04% |

Magnesium oxide 1 is relatively fast dissolving as compared to magnesium oxide 2. By changing the ratio of the these two MgO varieties, the predetermined crosslinking time may be achieved.

EXAMPLE 5

LOW TEMPERATURE SYSTEM WITH CHANGING COATING LEVELS OF BORIC ACID

Figure 11:
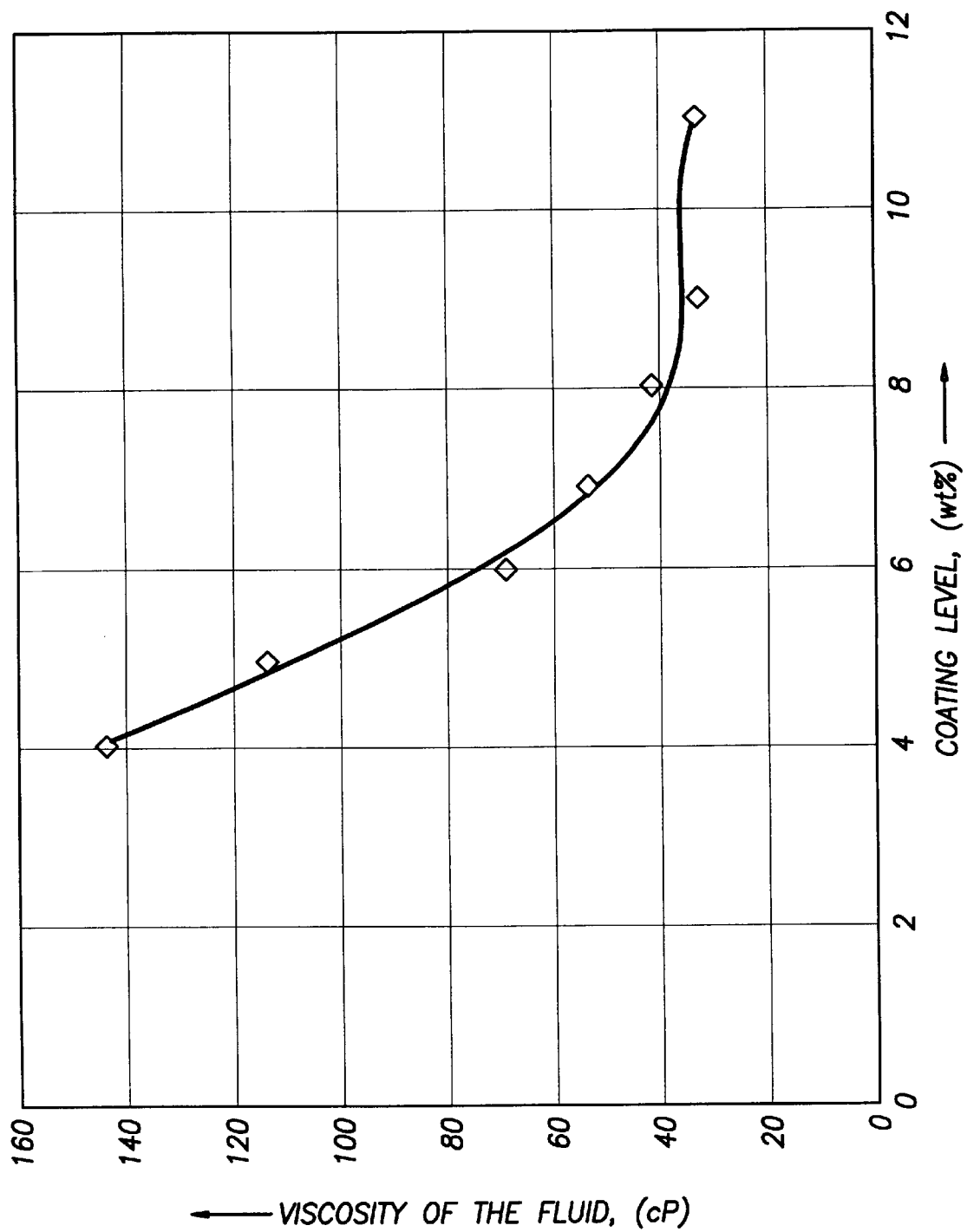
FIG. 11 shows the variation in viscosity of the hydrated dry blend with change in the coating level of the encapsulated borate.

The test procedure for examples in Table 7 comprised 9.25 g of dry blend made using the encapsulated borate with a different coating level. The composition of the dry blend is as described in Example 2 except that the coating level of the encapsulated borate is different. The dry blend was then added to water and Fann 35 viscosity measured following the procedure of the composition as shown in Example 1 above. The results of this particular test are listed in Table 7 and plotted in FIG. 11.

TABLE 6b

| Lb/M gal | Example M1 | Example M2 | Example M3 |
| --- | --- | --- | --- |
| KCl | 41.75 | 41.75 | 41.75 |
| Antifoam Agent | 6.58 | 6.58 | 6.58 |
| Guar | 30 | 25 | 22 |
| MGO 2 | 3 | 3 | 3 |
| MGO 1 | 0.5 | 0.5 | 0.5 |
| Sodium Thiosulfate | | | |
| KF | | | |
| Encapsulated Boric Acid | 4(7% SCX1530) | 4(11% SCX1530) | 3(15% SCX1530) |

TABLE 7

| Examples | Coating Levels (%) | Viscosity of Fann 35 (cp) at 170 1/s |
| --- | --- | --- |
| C1 | 4 | 144 |
| C2 | 5 | 114 |
| C3 | 6 | 69 |
| C4 | 7 | 54 |
| C5 | 8 | 42 |
| C6 | 9 | 33 |
| C7 | 11 | 33 |

EXAMPLE 6

LOW TEMPERATURE SYSTEM WITH NON-ENCAPSUALTED BORIC ACID

Adding boric acid without encapsulation also can affect the release time. A dry blend, therefore, also can include unencapsulated borate to adjust the desired crosslink time of fluids (or viscosity development process). If a long delay in crosslink is desired, high coating level can be applied. If shorter delay or early viscosity is desired, a thinner coating or a heavier coating combined with unencapsulated borate can be used. Below in Table 8 are shown examples utilizing boric acid, in which the composition of the dry blend is the same as that described in the example of data shown in Table 2 except that the encapsulated borate crosslinker is substituted by a combination of encapsulated borate and unencapsulated borate.

TABLE 8

| (Ex. #) | coating levels (%) | encapsulated borate concentration lb/Mgal | BORIC ACID concentration lb/Mgal | Viscosity of Fann 35 (cp) at 170 l/s |
|---|---|---|---|---|
| 092496-03 | 11 | 3.75 | 0 | 34.5 |
| 092496-01 | 11 | 3.375 | 0.375 | 37.5 |
| 092596-01 | 11 | 3.19 | 0.56 | 55.5 |
| 092496-02 | 11 | 3.75 | 0.75 | 75 |
| 092596-02 | 11 | 2.81 | 0.94 | 98.5 |
| 092496-04 | 11 | 2.625 | 1.125 | 34.5 |

In the example shown in Table 8, when unencapsulated borate is added to the dry blend, the crosslinking time of the fluid is shortened; however, when too much unencapsulated borate is added to the dry blend as in the last example in the above table, the hydration of polymer was inhibited and resulted in poor viscosity. Thus it is a matter of balance.

EXAMPLE 7

HIGH TEMPERATURE SYSTEM WITH NON-ENCAPSULATED BORIC ACID

In a low temperature system, the composition of the dry blend is the same as described in the Example 2 (Table 2) except that the encapsulated borate crosslinker is substituted by a combination of encapsulated borate and unencapsulated borate. Also, NaF was not employed because no Fann 50 tests were conducted at high temperatures.

TABLE 9

| examples (Test #) | coating levels (%) | encapsulated borate concentration lb/Mgal | BORIC ACID concentration lb/Mgal | Viscosity of Fann 35 (cp) at 170 l/s |
|---|---|---|---|---|
| 090696-02 | 11 | 5.75 | 0 | 75 |
| 100396-07 | 11 | 5.18 | 0.58 | 198 |
| 100396-05 | 11 | 4.89 | 0.86 | 240 |
| 100396-04 | 11 | 4.6 | 1.15 | 210 |
| 100396-06 | 11 | 4.31 | 1.44 | 210 |

The encapsulated borate with 11% SCX-1530 coating in these examples were coated in an industrial scale coater. SCX1530 coating refers to a coating that is an acrylic polymer emulsion from SC Johnson Polymer, 1525 Howe Street, Racine, Wis. 53403.

In the example shown in Table 9, the crosslinking time is shortened by the addition of unencapsulated borate to the high temperature blend. However, when more unencapsulated breaker is added as in the last two examples in Table 9, lower viscosity resulted, and the fluid texture was not as good as when less unencapsulated borate was added to the dry blend. This coating is applied by the Wurster process, which is a standard process in the industry, and known by those skilled in the art, as further described herein.

EXAMPLE 8

RHEOLOGY OF DRY BLENDS WITH NON-ENCAPSULATED BORIC ACID

Shown below is an example of dry blends with non-encapsulated boric acid.

TABLE 10

| CHEMICAL NAME | CONCENTRATION IN FIELD UNITS (lb/Mgal unless otherwise specified) | AMOUNT IN 900 ml FLUID (g unless otherwise specified) |
|---|---|---|
| M 290 | 0.25 gal/Mgal | 0.25 ml |
| KCl | 34.79 | 3.756 |
| Antifoam Agent | 5.48 | 0.592 |
| Guar | 25 | 2.699 |
| Boric Acid | 0.9375 | 0.101 |
| MgO 1 | 5.625 | 0.607 |
| Boric Acid/11% SCX 1530 | 2.8125 | 0.304 |
| sodium acetate anhydrous | 1.61 | 0.174 |
| citric acid | 0.85 | 0.092 |
| total | | 8.324 |

Below in Table 11 are the components of the compositions including their concentration levels:

TABLE 11

| M290 | 0.25 gal/Mgal | 0.25 ml |
|---|---|---|
| KCL | 41.69 lb/Mgal | 4.500 g |
| ANTIFORM AGENT | 6.58 lb/Mgal | 0.710 g |
| Guar | 32 lb/Mgal | 3.454 g |
| BORIC ACID | 1.4375 lb/Mgal | 0.155 g |
| MgO | 8 lbs/Mgal | 0.864 g |
| Sodium thiosulfate | 4.8 lbs/Mgal | 0.518 g |
| NaF | 15 lbs/Mgal | 1.619 g |
| Boric acid w/11% SCX1530 | 4.3125 lbs/Mgal | 0.466 g |
| sodium acetate (anhydrous) | 2.41 lbs/Mgal | 0.260 g |
| L01 citric acid | 2.119 lbs/Mgal | 0.229 g |
| | | 12.776 g |

The results of the Fann 50 rheology were as shown below in Table 12:

TABLE 12

| Time (min) | Apparent Viscosity at 100 l/s in Fann 50 at 175° F. | Apparent Viscosity at 100 l/s in Fann 50 at 250° F. |
|---|---|---|
| 3 | 299 | 403 |
| 20 | 335 | 178 |
| 50 | 407 | 283 |
| 80 | 422 | 240 |
| 110 | 446 | 209 |
| 140 | 458 | 169 |
| 170 | 451 | 155 |
| 200 | | 152 |
| 230 | | 107 |

The second column lists the results of fluid described in Table 10, while the last column lists the results of fluid described in Table 11.

It has been noted that in place to NaF, KF and other fluorides may also be used in the dry blends, including compounds comprising NaF, KF, alkali metal fluoride salts, soluble metal fluoride salts, ammonium fluoride, ammonium bifluoride, and organic fluoride-containing salts.

EXAMPLE 9

PREFORMULATED FRACTURING FLUID ADDITIVES IN DIESEL SLURRY

To prepare a preformulated fracturing fluid additive in diesel slurry, 0.71 g of solid antifoam, 3.778 g of guar, 0.864 g of MgO, 0.518 g of sodium thiosulfate(anhydrous), 1.619 g of sodium fluoride, 0.621 g of encapsulted borate, 0.260 g of sodium acetate(anhydrous) and 0.23 g of citric acid are blended and mix with 4.6 g of #2 diesel which results in a pumpable slurry. The slurry is then added to water in a constant shear mixer to make a fluid with guar concentration of 35 lb/1,000 gal water. The constant shear mixer is set at 1630 RPM and the fluid is sheared for 5 min before it is transferred to the rotating Fann 50 cup. The Oil bath of the Fann 50 is preheat to 250° F. and the fluid is immediately subject to high temperature and shear rate of 100 1/s once it is in the Fann 50 cup. The viscosity of the fluid maintains at above 200 cps for 90 min and above 100 cps for about 120 min.

The preformulated fracturing fluid additives in diesel slurry are useful in locations where there is no dispersing equipment to disperse dry additives directly into water.

EXAMPLE 10

USE OF ZIRCONATES

Zirconates also may be employed in the practice of this invention, as seen further in Tables 13 and 14. This zirconate testing was accomplished at 250° F. using 40 lb/Mgal of guar.

TABLE 13

ZIRCONIUM DRY BLEND FANN 50 RESULTS
MIXER SHEAR HISTORY
(@ 1630 rpm for 5 minutes)
250 DEGREES F.
40 LB. GUAR/1000 GAL.

| FLUID COMPOSITION | (LB/1000 GAL.) | |
|---|---|---|
| M117 | 45.59 | |
| J457 | 40 | |
| D046 | 7.2 | |
| SODIUM THIOSULFATE | 5.25 | |
| FUMARIC ACID | 5 | |
| J464 | 5 | |
| M003 | 9.58 | |
| MAGCHEM 20 | 0.5833 | |
| SOLID ZIRCONIUM CROSSLINKER | 1.4 | |
| M290 | 0.25 GAL./1000 GAL. | |
| INITIAL pH 6.64 | | |
| FINAL pH 8.46 | | |
| TEST NO. => | 5711_10 | 5711_10A |
| TIME (MIN.) | VISC. @ 40 SEC-1 | |
| 0 | 174 | 157 |

TABLE 13-continued

ZIRCONIUM DRY BLEND FANN 50 RESULTS
MIXER SHEAR HISTORY
(@ 1630 rpm for 5 minutes)
250 DEGREES F.
40 LB. GUAR/1000 GAL.

| | | |
|---|---|---|
| 30 | 196 | 204 |
| 60 | 138 | 129 |
| 90 | 107 | 114 |
| 120 | 95 | 98 |
| 150 | 83 | 98 |
| | VISC. @ 100 SEC-1 | |
| 0 | 134 | 130 |
| 30 | 220 | 185 |
| 60 | 146 | 123 |
| 90 | 117 | 107 |
| 120 | 97 | 91 |
| 150 | 81 | 89 |

TABLE 14

ZIRCONIUM DRY BLEND FANN 50 RESULTS
MIXER SHEAR HISTORY
(@ 1630 rpm for 5 minutes)
250 DEGREES F.
40 LB. GUAR/1000 GAL.

| FLUID COMPOSITION | (LB/1000 GAL.) |
|---|---|
| M117 | 45.59 |
| J457 | 40 |
| D046 | 7.2 |
| SODIUM THIOSULFATE | 5.25 |
| FUMARIC ACID | 5 |
| J464 | 5 |
| M003 | 7.8 |
| MAGCHEM 20 | 0.58 |
| SOLID ZIRCONIUM CROSSLINKER | 1.4 |
| M290 | 0.25 GAL./1000 GAL. |
| INITIAL pH 6.55 | |
| FINAL pH 9.02 | |
| TEST NO. => | 5711_14 |
| TIME (MIN.) | VISC. @ 40 SEC-1 |
| 0 | 97 |
| 30 | 145 |
| 60 | 388 |
| 90 | 161 |
| 120 | 114 |
| 150 | 95 |
| | VISC. @ 100 SEC-1 |
| 0 | 73 |
| 30 | 122 |
| 60 | 338 |
| 90 | 178 |
| 120 | 129 |
| 150 | 103 |

EXAMPLE 11

STORAGE STABILITY

Sample A. A sample containing 46% (all in wt % in this example) KCl, 7% antifoam, 33% guar, 5% MgO, 3% sodium acetate, 0.5% citric acid, and 4.5% encapsulated boric acid is placed in an oven that is set at 110±10° F. for accelerated storage stability test. After 18 days, 9.05 g of this sample is taken out and added to 1000 ml water to make a crosslinked fluid with guar concentration of 25 lb/1000 gal. After being sheared 2.5 min at 900 rpm in the controlled shear mixer, the fluid is loaded to a rotating Fann 50 cup for rheology measurement at 175° F. Table 15 shows the rheology data of this fluid.

TABLE 15

| | Viscosity (cp) at 100 1/s | | |
|---|---|---|---|
| Time (min) | Sample A | Sample B | Sample C |
| 3 | 353 | 234 | 252 |
| 20 | 319 | 308 | 276 |
| 50 | 397 | 376 | 186 |
| 80 | 403 | 422 | 195 |
| 110 | 423 | 440 | 211 |
| 140 | 421 | 391 | 212 |
| 170 | 412 | 361 | 218 |

Sample B. A sample containing 45% (all in wt % in this example), 7% antifoam, 33% guar, 7.3% MgO, 2.09% sodium acetate anhydrous, 1.1% citric acid, and 3.75% encapsulated boric acid is placed in a warehouse where temperature varies between 60–95° F. After 43 days, 9.25 g of this sample is taken out and added to 1000 ml water to make a crosslinked fluid with guar concentration of 25 lb/1000 gal. After being sheared 2.5 min at 900 rpm in the controlled shear mixer, the fluid is loaded to a rotating Fann 50 cup for rheology measurement at 175° F. Table 15 shows the rheology data of this fluid.

Sample C. A sample containing 35.2% (all in wt % in this example) KCl, 5.6% antifoam, 27% guar, 6.8% MgO, 13% NaF, 2% sodium acetate, 1.8% citric acid, 4% sodium thiosulfate and 4.9% encapsulated boric acid is placed in a warehouse where temperature varies between 60–95° F. After 60 days, 14.2 g of this sample is taken out and added to 1000 ml water to make a crosslinked fluid with guar concentration of 32 lb/1000 gal. After being sheared 5 min at 1300 rpm in the controlled shear mixer, the fluid is loaded to a rotating Fann 50 cup for rheology measurement at 250° F. Table 15 shows the rheology data of this fluid.

EXAMPLE 12

SLURRY

Sample D. A stable and easy-to-pump slurry blend is made to contain the following components: 5.6% antifoam, 25% guar, 6.6% MgO, 0.5% sodium acetate anhydrous, 0.26% citric acid, 1% boric acid, 2.9% encapsulated boric acid and 58% viscosified mineral oil. Thirteen grams of this slurry is added to 1000 ml water containing 2% KCl to make a crosslinked fluid with guar concentration of 30 lb/1000 gal, following the addition of 0.2% surfactant and 0.5% mutual solvent. The fluid is then mixed in a controlled shear mixer for 3 min at 2100 RPM and then another 2.5 min at 960 rpm. Afterward, the fluid is loaded into a rotating Fann 50 cup for rheology measurement at 175° F. Table 16 lists the rheology data of this fluid.

TABLE 16

| Rheology of the fluid in Sample D | |
|---|---|
| Time (min) | Viscosity (cp) at 100 1/s |
| 3 | 552 |
| 20 | 426 |
| 50 | 446 |
| 80 | 474 |
| 110 | 493 |
| 140 | 492 |
| 170 | 498 |

The Wurster Process

As described briefly in the preceding discussion, one of the most suitable coating techniques known in the art for pumping service application is the Wurster Process, in which particles are spray-coated while suspended in an upward-moving air stream. This process is one preferred method to achieve encapsulation or coating for deployment of this invention.

In the process, particles are supported by a perforated plate having different patterns of holes inside and outside a cylindrical insert. Just sufficient air is permitted to rise through the outer annular space to fluidize the settling particles. Most of the rising air (usually heated) flows inside the cylinder, causing the particles to rise rapidly. At the top, as the air stream diverges and slows, they settle back onto the outer bed and move downward to repeat the cycle. The particles pass through the inner cylinder many times in a few minutes. As the particles start upward, the particles encounter a fine spray of the coating solution. Only a small amount of solution is applied in each pass. Hence, the solvent is driven off and the particles are nearly dry by the time they fall back onto the outer bed. Particles as large as tablets or as small as 150 um can be coated easily. Since many thin layers of coating are sprayed onto all surfaces of the randomly oriented particles, a uniform coating is applied, even on crystals or irregular particles.

Top spray fluidized bed techniques also may be used to prepare the encapsulated particles. As noted earlier, the borate crosslinking agent is encapsulated using the Wurster Process. As also noted earlier, the particulate base may also be encapsulated.

The coating may be selected from one or more of the following "acrylic resins, acrylic polyols, acrylic polymers, styrenated acrylic polymers, styrene acrylic polymers having colloidal solutions or emulsions, polyvinylidene chloride, hydroxypropylmethylcellulose, ethylcellulose, ethylene acrylic acid polymers, carboset-acrylic resin, and polytetrafluoroethylene.

The invention has been described in the more limited aspects of preferred embodiments hereof, including numerous examples. Other embodiments have been suggested and still others may occur to those skilled in the art upon a reading and understanding of the this specification. It is intended that all such embodiments be included within the scope of this invention.

What is claimed is:

1. A dry blended particulate composition for hydraulic fracturing, comprising:

(a) a particulate hydratable polysaccharide, the polysaccharide being formed of discrete particles and capable of continuous mixing to form a viscous fracturing fluid composition, (b) an encapsulated particulate borate crosslinking agent, the crosslinking agent effective to crosslink the hydratable polysaccharide once hydrated, and (c) a particulate slowly releasing base which provides a delay in the availability of base to raise the pH to the level required to achieve crosslinking.

2. The composition of claim 1 further wherein the composition is a foamed composition.

3. The composition of claim 1 further wherein the hydratable polysaccharide is selected from the group consisting of guar, hydroxypropyl guar, carboxymethyl guar, carboxymethylhydroxypropyl guar, synthetic polymers, and guar-containing compounds.

4. A dry blend particulate composition for hydraulic fracturing of subterranean formations, comprising:
  (a) a particulate hydratable polysaccharide, the polysaccharide being formed of discrete particles and capable of continuous mixing to form a viscous fracturing fluid composition, the hydratable polysaccharide being selected from hydroxypropyl guar, carboxymethylhydroxypropyl guar, carboxymethyl guar, synthetic polymers, and guar-containing compounds;
  (b) an encapsulated particulate borate crosslinking agent, said agent effective to crosslink the hydratable polysaccharide once hydrated; and
  (c) a pH adjusting compound.

5. A stable particulate composition for hydraulic fracturing of subterranean formations, comprising:
  (a) a particulate hydratable polysaccharide,
  (b) an encapsulated particulate borate crosslinking agent, and
  (c) a particulate base.

6. The composition of claim 5 further wherein the particulate base is encapsulated.

7. The composition of claim 5 further wherein the composition includes a particulate buffer, the buffer capable of rapidly adjusting the pH of the composition into the desired range for polysaccharide hydration.

8. The composition of claim 5 further wherein the particulate crosslinker is capable of crosslinking the polysaccharide effectively while maintaining adequate viscosity at temperatures in excess of about 130° F.

9. The composition of claim 5 wherein the composition is dispersed into a foam by a gaseous substance, the gaseous substance selected from $N_2$ and $CO_2$.

10. The composition of claim 5 further wherein the encapsulated particulate borate crosslinking agent is encapsulated with a coating, the coating being dissolvable at pH values greater than about 8.

11. The composition of claim 10 wherein the coating is selected one or more of the following: acrylic resins, acrylic polyols, acrylic polymers, styrenated acrylic polymers, styrene acrylic polymers having colloidal solutions or emulsions, polyvinylidene chloride, hydroxypropylmethylcellulose, ethylcellulose, ethylene acrylic acid polymers, carboset-acrylic resin, and polytetrafluorocthylene.

12. A particulated composition for hydraulic fracturing of subterranean formations, comprising:
  (a) a particulate hydratable polysaccharide,
  (b) an encapsulated particulate borate crosslinking agent,
  (c) a particulate base, and
  (d) a buffer.

13. The composition of claim 12 further comprising a salt.

14. The composition of claim 12 further comprising an antifoaming agent.

15. A dry blend composition adapted for application as a particulate component of an aqueous fracturing fluid, wherein the particulate component comprises a dry mixture of particulate galactomannan gum, an encapsulated particulate borate-containing crosslinking species, and a particulate alkaline base.

16. The composition of claim 15 wherein the composition is effective at temperatures above about 200° F.

17. The composition of claim 15 wherein the composition is effective at temperatures above about 300° F.

18. The composition of claim 15 wherein the particulate alkaline base is a metal oxide.

19. The composition of claim 18 wherein the metal oxide is selected from magnesium oxides, calcium oxides, strontium oxides, and oxides of group IIa metals.

20. A dry blend composition adapted for application as a particulate component of an aqueous fracturing fluid useful at subterranean temperatures up to about 175° F., wherein the particulate component comprises a dry mixture of galactomannan gum, an encapsulated borate-containing crosslinking species, and a metal oxide.

21. The dry blend composition of claim 20 wherein the ratio of galactomannan gum to borate-containing crosslinking species by weight is between about 4:1 and 12:1, and the ratio of borate-containing crosslinking species to metal oxide is between about 1:1 and 1:4.

22. A method of fracturing, comprising:
  (a) providing a dry blend according to claim 12;
  (b) providing a liquid;
  (c) providing a blending device;
  (d) mixing the dry blend with the liquid to form a first composition;
  (e) blending the first composition in the blending device;
  (f) discharging the first composition through a tubular; and
  (g) developing an effective viscosity of the first composition.

23. The method of claim 22 wherein the time required to perform steps (d) through (f) is no greater than about 3 minutes.

24. The method of claim 22 wherein at the discharging step (f), the viscosity of the first composition is at least 20 cp @ 170 $sec^{-1}$.

25. The method of claim 22 wherein the viscosity of the first composition at a time 8 minutes after beginning step (f) is at least 50 cp @ 170 $sec^{-1}$, the tubular having an inner diameter not less than 1.6 inches.

26. The method of claim 22 wherein the minimum viscosity in the fracture, as measured by laboratory simulation, is at least 50 cp @ 170 $sec^{-1}$.

27. The method of claim 25, wherein the specified viscosity is achieved in a time of no greater than about 5 minutes.

28. The method of claim 25, wherein the specified viscosity is achieved in a time of no greater than about 1 minute.

29. A method of fracturing, comprising
  (a) providing a dry blend according to claim 4;
  (b) providing a liquid;
  (c) mixing the dry blend with the liquid to form a first composition;
  (d) blending a proppant with the first composition to form a slurry; and
  (e) pumping the slurry through a tubular.

30. The method of claim 29 further wherein the time required to perform steps (c) and (d) is no greater than about 3 minutes.

31. The method of claim 29 further wherein following step (d) the viscosity of the slurry is at least 20 cp @ 170 $sec^{-1}$.

32. A method comprising:
  (a) providing a dry blend according to claim 15;
  (b) providing a liquid;
  (c) mixing the dry blend, liquid, and proppant to form a slurry;
  (d) pumping the slurry through a tubular;
  (e) wherein the time required to perform step (c) is no greater than about 3 minutes;
  (f) further at the conclusion of step (c) the viscosity of the slurry is at least 20 cp @ 170 $sec^{-1}$; and (g) the viscosity of the slurry at a time 8 minutes after the beginning of step (d) is at least 50 cp @ 170 sec$^{-1}$ as measured in a tubular having an inner diameter of at least 1.6 inches.

33. The method of claim 32 wherein the time required to perform step (c) is no greater than about two minutes.

34. The method of claim 32, further wherein the time period in step (g) is no greater than about 5 minutes.

35. The method of claim 32 wherein the time period in step (g) is no greater than about 1 minute.

36. A dry blended particulate composition for hydraulic fracturing of subterranean formations, comprising:
    (a) a hydratable polysaccharide, the polysaccharide being formed of discrete particles and capable of continuous mixing to form a viscous fracturing fluid composition, the hydratable polysaccharide being selected from the group of polysaccharides consisting of hydroxypropyl guar, carboxymethyl guar, carboxymethylhydroxypropyl guar, synthetic polymers, and guar-containing compounds; and
    (b) an encapsulated particulate borate crosslinking agent.

37. A method comprising
    (a) providing a dry blend according to claim 36;
    (b) providing an aqueous liquid;
    (c) mixing the dry blend with the aqueous liquid to form a first composition;
    (d) pumping the first composition through a tubular into a fracture;
    (e) developing a viscosity of the first composition in the fracture that is effective to create a fracture width for placement of proppant.

38. The method of claim 37 wherein the time required to perform step (c) is no greater than about two minutes.

39. A method comprising
    (a) providing a dry blend according to claim 15;
    (b) providing a liquid;
    (c) mixing the dry blend with the liquid to form a first composition;
    (d) pumping the first composition through a tubular;
    (e) developing an effective viscosity of the first composition;
    (f) wherein the time required to perform step (c) is no greater than about ninety seconds;
    (g) further wherein following step (c), the viscosity of the first composition is at least 20 cp @ 170 sec$^{-1}$.

40. A method comprising:
    (a) providing a dry blend according to claim 36;
    (b) providing a hydrocarbon;
    (c) mixing the dry blend with the hydrocarbon to form a first composition;
    (d) providing an aqueous liquid;
    (e) mixing the first composition with the aqueous liquid to form a second composition;
    (f) pumping the second composition through a tubular.

41. The method of claim 40 further wherein a stable slurry of solids in hydrocarbon liquid is formed prior to step (d).

42. A method of treating a subterranean formation using a fluid which is rapidly hydrated at the well site using as a starting ingredient a dry blended particulate, comprising:
    (a) providing a first water based liquid component,
    (b) providing a dry particulate component according to claim 36,
    (c) mixing the first water based liquid component and dry particulate component to form a fluid, and
    (d) pumping the fluid into a tubular.

43. The method of claim 42 further including the step of facilitating substantially simultaneous hydration and crosslinking of the fluid.

44. The method of claim 42 wherein the amount of time between the beginning of step (c) and the beginning of step (d) is minimized to no more than 5 minutes.

45. A method of treating a subterranean formation using a fracturing fluid which is rapidly hydrated at the well site using as a starting ingredient a dry blended particulate, comprising:
    (a) providing a water based liquid component,
    (b) providing a dry particulate component according to claim 15,
    (c) mixing the water based liquid component and dry particulate component,
    (d) facilitating the hydration and crosslinking of the galactomannan gum substantially simultaneously, and
    (e) forming a crosslinked fracturing fluid.

46. The fracturing fluid of claim 45 further wherein the crosslinked fracturing fluid achieves a viscosity of at least 100 cp at between 70 and 350° F.

47. A process of fracturing a subterranean formation penetrated by a wellbore using a fracturing fluid formed from a dry particulate blend, the process comprising:
    (a) providing a dry particulate blended composition according to claim 15, the polysaccharide comprising molecular chains, of saccharide units, the molecular chains having along their length bonding sites,
    (b) mixing the dry particulate blended composition with an aqueous component to form a fracturing fluid,
    (c) pumping the fracturing fluid into a wellbore,
    (d) hydrating the polysaccharide during transit of the fracturing fluid through the wellbore,
    (e) crosslinking the polysaccharide during hydration of the polysaccharide.

48. The method of claim 47 additionally comprising the step of:
    (f) controlling the degree of crosslinking of the polysaccharide during the hydration step by controlling the rate of dissolution of the base.

49. The method of claim 48 further wherein controlling the rate of dissolution of the base is accomplished by using particles of slowly dissolving base, the particles being generally capable of releasing measured amounts of base over time.

50. The method of claim 48 further wherein the step of controlling the rate of dissolution of base is facilitated by using an encapsulated base.

51. The method of claim 50 further wherein the encapsulated base results in a small or negligible amount of release of base during step (c), followed by measured release of the base after step (c).

52. The composition of claim 18, wherein the metal oxide is at least one magnesium oxide.

53. The composition of claim 52, further comprising a fluoride salt.

54. The composition of claim 53, wherein the fluoride salt is sodium fluoride.

55. The composition of claim 15, further comprising a high temperature stabilizer.

56. The composition of claim 55, wherein the high temperature stabilizer is sodium thiosulfate.

57. The composition of claim 15, further comprising a dry buffer system to initially adjust the pH of the fracturing fluid to allow hydration of the galactomannan gum to begin.

* * * * *